United States Patent [19]

Mathews, III

[11] Patent Number: 4,677,903
[45] Date of Patent: Jul. 7, 1987

[54] CONSTRUCTION UTILIZING A PASSIVE AIR SYSTEM FOR THE HEATING AND COOLING OF A BUILDING STRUCTURE

[76] Inventor: J. F. Mathews, III, P.O. Box 190647, Miami Beach, Fla. 33119

[21] Appl. No.: 759,205

[22] Filed: Jul. 26, 1985

[51] Int. Cl.⁴ ............................................. F24F 7/00
[52] U.S. Cl. ......................................... 98/31; 52/22; 98/88.1
[58] Field of Search ................ 52/22, 199; 98/31, 32, 98/88.1, DIG. 6; 126/431, 450

[56] References Cited

U.S. PATENT DOCUMENTS

| | | | |
|---|---|---|---|
| 1,995,213 | 3/1935 | Martin | 98/32 X |
| 2,595,613 | 5/1952 | Spencer | 98/31 |
| 2,852,109 | 9/1958 | Pine | 98/31 X |
| 3,323,266 | 6/1967 | Dalkas | 98/32 X |
| 3,368,473 | 2/1968 | Sohda et al. | 98/31 |
| 3,990,635 | 11/1976 | Restle et al. | 126/429 X |
| 4,286,420 | 9/1981 | Pharmakidis | 126/431 |
| 4,364,375 | 12/1982 | Younghouse | 126/450 X |

Primary Examiner—Harold Joyce
Attorney, Agent, or Firm—John Cyril Malloy

[57] ABSTRACT

A system for heating and cooling external roof and wall surfaces of existing building structures incorporated in supplementary building construction to be added to the roof and/or external walls of an existing building structure wherein the supplementary construction added to the building structure serves to selectively create air flow over external surfaces of the building or alternately trap air in a substantially closed air space chamber wherein it is subjected to heat absorption from an external panel or structure exposed to the sun's radiant energy. The construction of the present invention is specifically structured and configured to take advantage of naturally occurring pheonomenon such as solar radiation, movement of air currents through convection and the capturing of naturally forced air such as wind.

11 Claims, 10 Drawing Figures

CONSTRUCTION UTILIZING A PASSIVE AIR SYSTEM FOR THE HEATING AND COOLING OF A BUILDING STRUCTURE

BACKGROUND OF THE INVENTION

1. Field of the Invention

This invention relates to supplementary construction to be placed on an existing building for the purpose of selectively creating air flow over external roof and/or wall surfaces or a body of trapped air over such external surfaces wherein the former serves to cool the building structure and the latter serves to heat the building structure. The subject supplementary construction is specifically designed to take advantage of natural occurring phenomenon including the continued flow of air currents through convection, the sun's radiant energy and naturally forced air or wind.

2. Description of the Prior Art

The prior art has long recognized that the proper ventilation of building structures is necessary and highly desirable in order to achieve certain cooling effects within the building as well as prevent damage to the roof and adjacent building structure from condensation. With regard to the latter, adequate ventilation is important for cooling but also particularly important where the roof is insulated. This is due to the effect that inadequate or no ventilation in an insulated roof structure permits the formation of condensation which, in addition to damaging the roof and the interior finishes, reduces the effectiveness of such insulation.

Prior art structures and techniques directed to ventilating building structures are disclosed and generally represented in the following patents to Gilman, U.S. Pat. No. 340,570; Katt et al, U.S. Pat. No. 2,954,727; Meyer et al, U.S. Pat. No. 3,236,170; and Belden, U.S. Pat. No. 3,481,263.

While the invention disclosed in the aforementioned patents are operable for their specifically intended function they are of questionable aid when it is desirable to effect cooling or heating of a building structure through utilizing the technique of cooling or heating external wall or roof surfaces by incorporating naturally occurring phenomenon.

SUMMARY OF THE INVENTION

The present invention is related to an uxiliary or supplementary building construction to be added to an existing building and in one embodiment comprises an external covering structure for the roof of the existing building. The covering structure may be in planar sheet form, or a plurality of sheet segments fixedly secured to one another. Alternately, the external covering structure may be of a shingle type configuration to add to the overall aesthetics of the finished building. Interconnecting means serves to fixedly attach the covering structure in spaced relation to the external surface of the roof on which it is mounted. By virtue of this interconnection, an air space is formed between the covering structure and the external surface of the roof. Both the longitudinal and transverse ends of the air space may be open and thereby communicate with the exterior of the air space so as to allow air to flow therethrough as to be explained in greater detail hereinafter.

An important feature of the present invention is the provision of a plurality of covering flaps each of which are mounted adjacent and in selectively covering relation to one of the longitudinal or transverse open ends of the air space. The covering flaps are specifically structured so as to allow an opening, for air passage through the open end or to be positioned in a closed or covering relation to the open ends so as to trap air within the air space. In the latter situation, a pocket or body of air is trapped within the air space in direct contact with the covering structure. Preferably, the covering structure is made from a fiberglass material or other heat conducting material which has its external surface exposed directly to the sun's radiant energy. When the air is trapped within the air space due to the closing of the covering flaps, such trapped air absorbs the heat from the external covering structure. This has the effect of course of adding to the heat of the entire building especially the interior thereof.

However, when a cooling effect is desired, all of the covering flaps are maintained in an open position. The interconnecting means, in its various embodiments, is specifically structured to define a plurality of air passages extending parallel to and along the slope of the roof and between opposite longitudinal ends. Also, a plurality of air channels are formed so as to provide a cross ventilation and provide a complete and oftentimes rapid flow of air over the external surface. This continued flow of air provides a cooling effect to the external surface of the roof and the building.

In another embodiment of the present invention, a facing sheet is hung or mounted in a depending fashion over but in spaced relation to an external wall surface of the existing building. An air chamber is thereby defined between the interior surface of the facing sheet and the exterior wall surface of the building. As in the above described embodiment, when circulated flow is allowed to pass throughout the air chamber, a cooling effect results. However, when the air is trapped within such air chamber, heat is absorbed from the facing material and the external surface of the wall is heated thereby adding to the interior heat of the building.

The invention accordingly comprises the features of construction, combination of elements, and arrangement of parts which will be exemplified in the construction hereinafter set forth and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
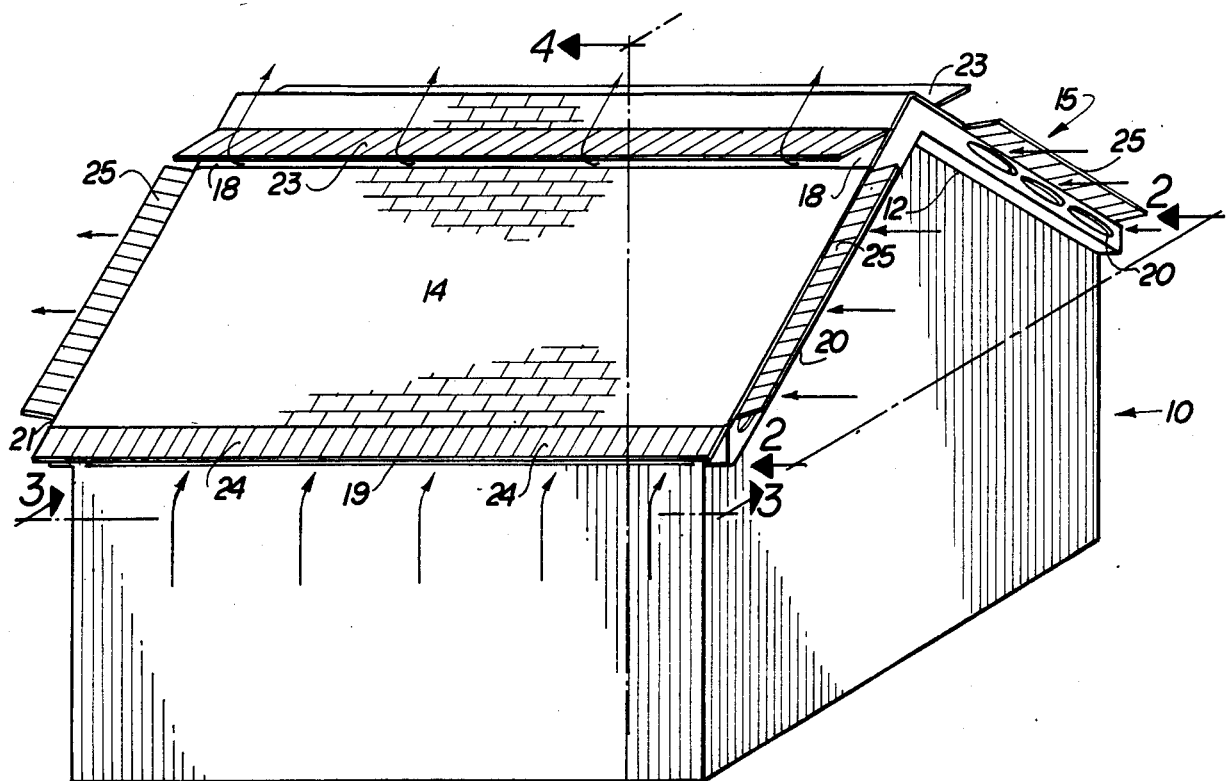
FIG. 1 is an isometric view of a building structure incorporating the supplementary construction of the present invention.

With regard to FIGS. 1 through 5, the present invention is directed to a supplementary building construction designed to be mounted on an existing building generally indicated as 10 and in covering relation to the existing roof structure thereof 12. Accordingly, the present invention may be referred to as a passive air system incorporated in a supplementary building construction wherein the latter comprises an external covering structure 14 mounted in covering and spaced relation to the external surface of the previously existing roof 12. In a preferred embodiment of the present invention, the external covering structure 14 may be substantially planar in overall configuration while being made up of a plurality of sheet segments fixedly or integrally secured to one another. Alternately, the covering structure 14 may be formed from a plurality of shingle type segments in order to change or enhance the aesthetic appearance of the supplementary construction generally indicated as 15. Further, the covering structure 14 is preferably made from a fiberglass or like heat absorbing material which, when exposed to the sun's radiant energy, will transfer heat to any air trapped within the air space generally indicated as 16 (see FIG. 5). This air space 16 is defined and disposed between the undersurface of the covering structure 14 and the previously exposed or external surface of the roof 12. The air space 16 includes open longitudinal ends 18 and 19 which respectively define the upper longitudinal open end and the lower longitudinal open end. In addition, the air space 16 includes open transverse ends 20 and 21 which also provide communication of the air space with the exterior of the existing building.

Figure 2:
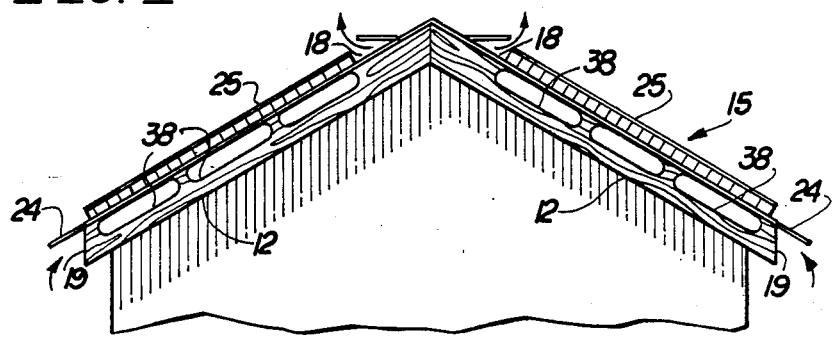
FIG. 2 is an end view along line 2—2 of FIG. 1.
Figure 3:
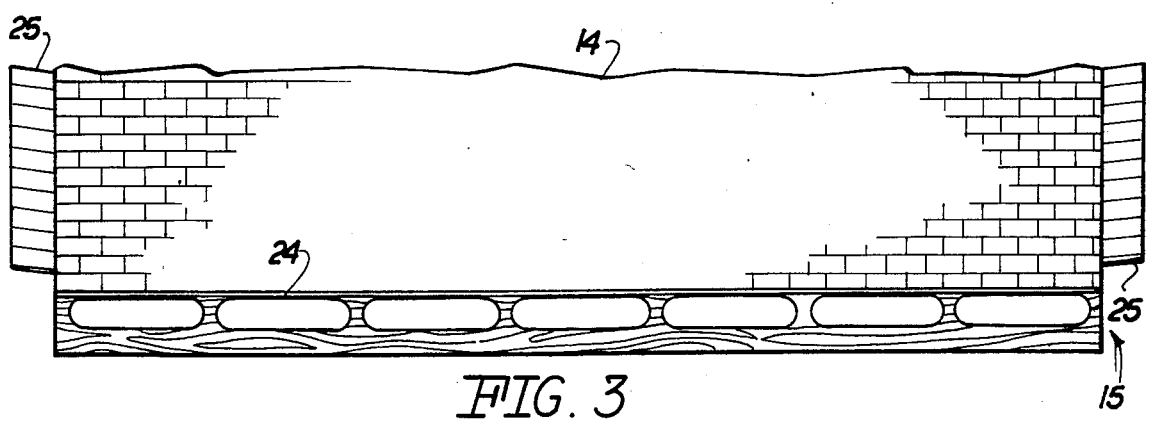
FIG. 3 is a side view along line 3—3 of FIG. 1.

Covering means in the form of covering flap assemblies 23, 24, 25, and 26 are mounted adjacent the respective longitudinal and transverse open ends 18, 19, 20, and 21 respectively and are specifically structured to be movable between an open and a closed position. With reference to FIGS. 1, 2 and 3, the plurality of flap assemblies are all positioned in an open position relative to the respective open ends which they may cover. In this position, free air flow may pass throughout the air space 16 as will be explained in greater detail with specific reference to FIG. 5.

Figure 4:
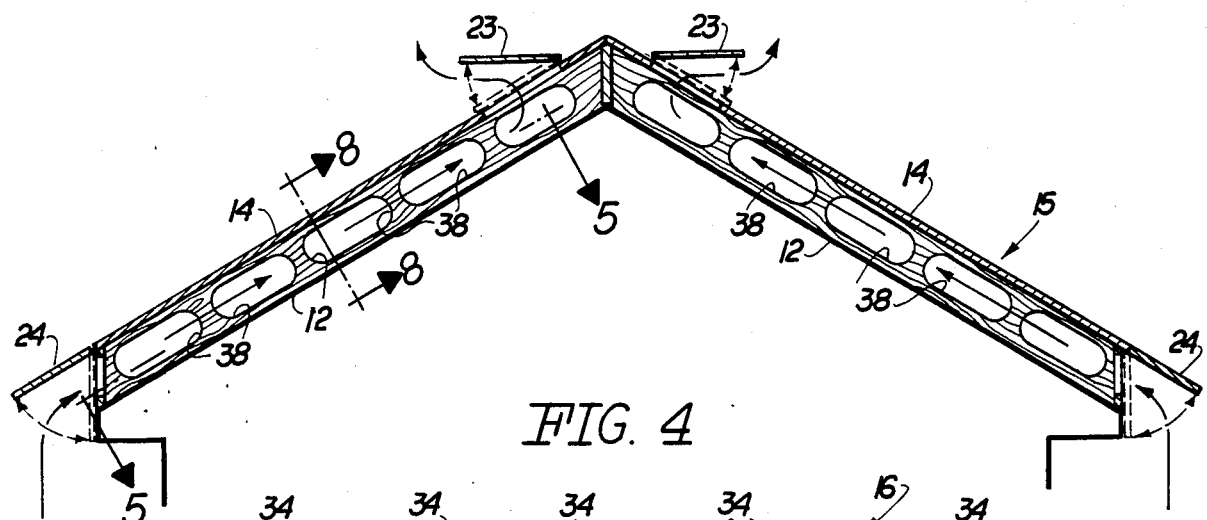
FIG. 4 is a sectional view along line 4—4 of FIG. 1 in partial cutaway.
Figure 5:
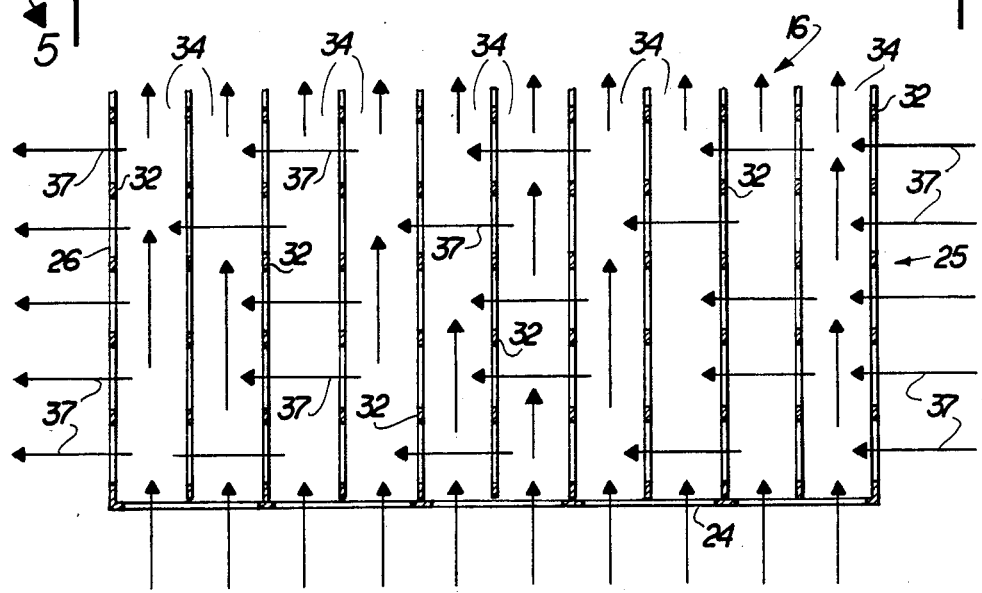
FIG. 5 is a sectional view in partial cutaway along line 5—5 of FIG. 4 showing paths of air current flow throughout a plurality of air passages and a plurality of air channels to establish a cross ventilation.

However, as set forth above, the plurality of flap assemblies 23, 24, 25, and 26 are also positionable into a closed position as indicated in broken lines in FIG. 4. When in such closed position, the air is effectively trapped within the air space 16 so as to absorb heat collected by the external covering structure 14. This in turn transfers the heat to the external surface of the roof 12 and aids in the heating of the existing building 10.

With reference to FIGS. 2, 4, 5 and 8, one embodiment of the present invention incorporates an interconnecting means generally indicated as 30 including a plurality of spaced apart studs 32 disposed in substantially parallel relation to one another and extending longitudinally from the lower open end 19 at an angular incline, to a point substantially adjacent the upper open longitudinal end 18. By virtue of this construction, a plurality of air passages 34 are disposed in spaced relation to one another and are substantially parallel as they extend between and in fluid communication with the opposite longitudinal open ends 18 and 19. Accordingly, the air passages 34 serve to effectively conduct air, do at least in part, to the normal transfer of air currents due to convection, along the length of the air passages 34 from the open end 19 and the exterior of the building thereabout to the upper open end 18 where such air is vented.

Figure 8:
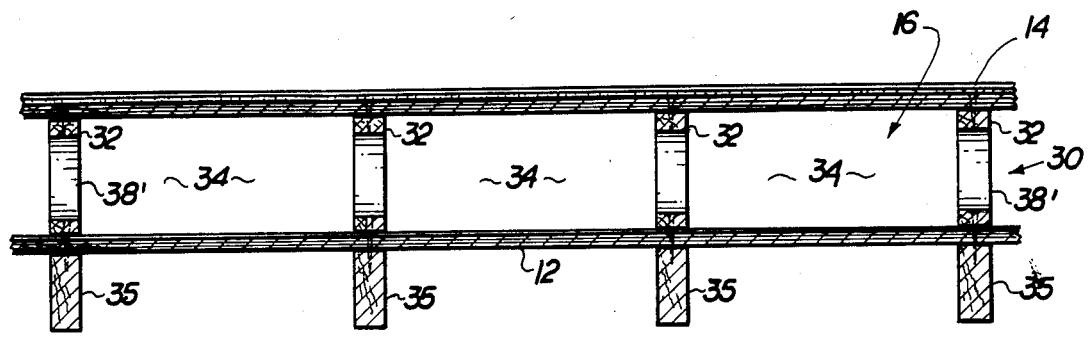
FIG. 8 is a sectional view along line 8—8 of FIG. 4 showing interior structural details of the interconnecting structure of the present invention.

Another feature of the present invention is the provision of a plurality of elongated apertures 38 integrally formed in spaced apart relation along the length of each of the studs 32. As shown in FIG. 8, each of the correspondingly positioned apertures in each of the plurality of studs 32 are disposed in aligned relation to one another so as to form air channels through which naturally forced air, such as wind, passes along as indicated by directional arrows 37 in FIG. 5. By virtue of air passing both along the air passages 34 as well as through the plurality of aligned apertures as at 38' (FIG. 8), a cross ventilation is established to thoroughly cool the interior of the space 16 and transmit such cooling feature directly to the roof 12 and thereby through to the interior of the building 10.

Figure 9:
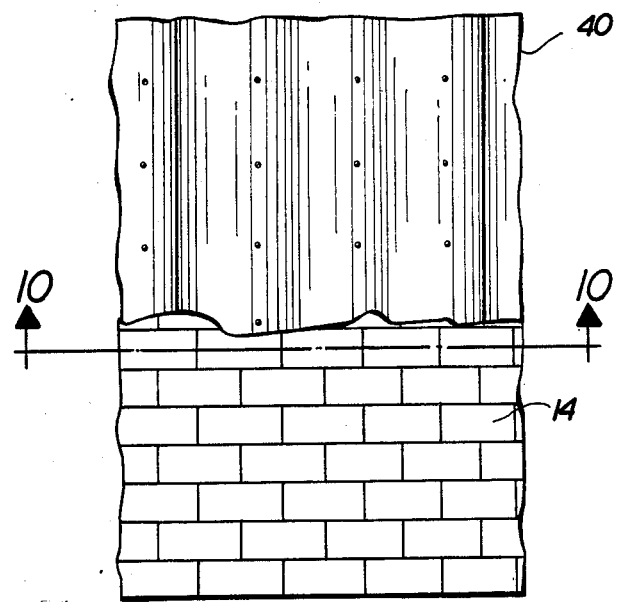
FIG. 9 is a top plan view in partial cutaway showing another embodiment of the interconnecting structure serving to affix an external covering structure in spaced relation to the external surface of the roof.
Figure 10:
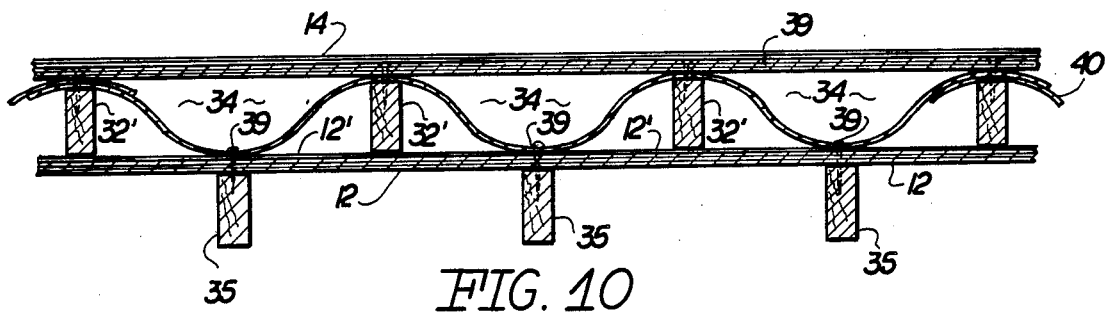
FIG. 10 is a sectional view along line 10—10 of FIG. 9.

With references to FIGS. 9 and 10, another embodiment of the present invention contemplates the utilization of a fiberglass or like material sheet 40 as the interconnecting means to secure the cover structure 14 to the external surface 12' of the roof 12. The sheet 40 serving as the interconnecting means serves to affix the cover structure 14 to the roof 12 by virtue of it having a corrugated crosssectional configuration (see FIG. 10) affixed by connector elements 39 to the intermediate studs 32' and to the normal or conventional roof studs 35 as shown in FIG. 10. Also, by virtue of the corrugated cross-sectional configuration extending along the length of the interconnecting sheet 40, troughs inherently formed in the corrugated sheet 40 serve as the air passages and are designated 34'.

Figure 6:
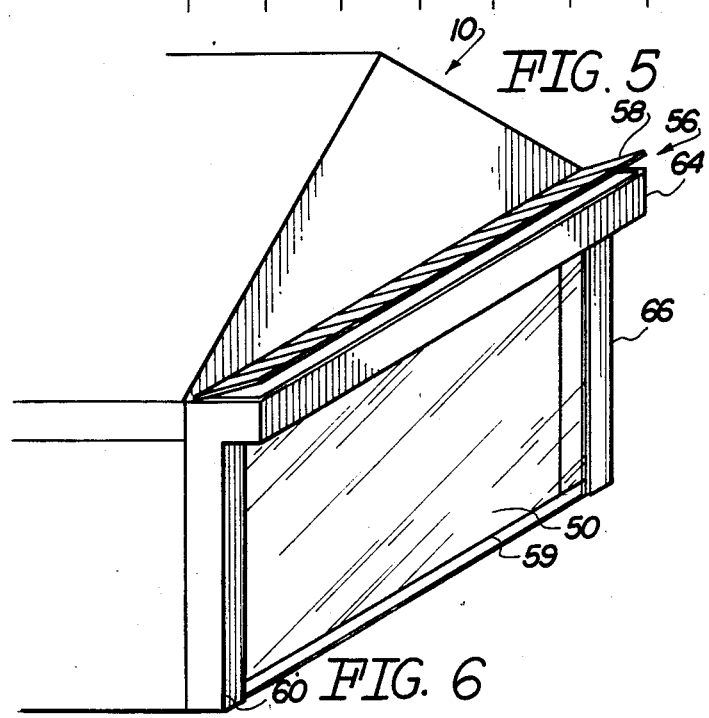
FIG. 6 is an isometric view in partial cutaway of another embodiment of the present invention directed to the heating and cooling of external wall surfaces of existing buildings.
Figure 7:
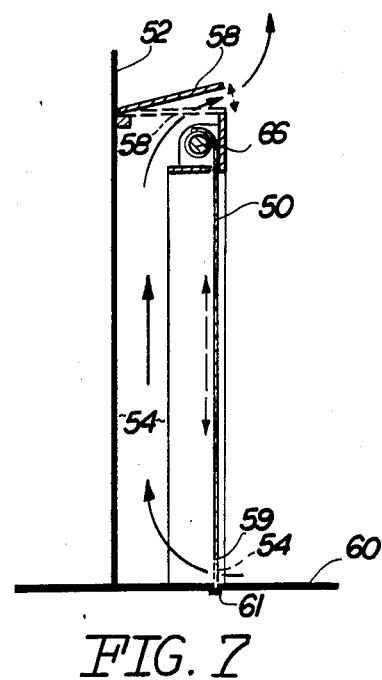
FIG. 7 is a sectional view of the embodiment of FIG. 6 with schematic air flow representation.

With references to FIGS. 6 and 7, yet another embodiment of the present invention comprises the provision of a facing sheet 50 formed of a flexible material which is capable of light polarization. The facing sheet 50 is disposed in spaced relation to an exterior wall surface 52 so as to define an air chamber 54 therebetween. A venting assembly generally indicated as 56 is formed adjacent the upper end of the facing sheet 50 and includes a venting flap 58 movable between an open position as shown in solid lines in FIGS. 6 and 7 and a closed position represented in broken lines in FIG. 7. When in its open position, the venting flap 58 allows communication between the exterior of the building and the air chamber 54. Air flow is established therethrough as the lower peripheral edge 59 is raised above the supporting surface or ground 60 on which the building structure is mounted. In such open position, air flow is allowed to be established thereby instigating a cooling effect to the exterior wall surface 52 and aiding in the cooling of the entire building structure.

To the contrary, when the facing sheet 50 is in its totally closed position as indicated by the peripheral edge 59 being anchored to or secured in engaging relation as at 61 to the surface 60, and further when the venting flap 58 is in its closed position, air is trapped within the air chamber 54. Heat is thereby absorbed by the trapped air due to the exposure of the facing sheet 50 of the radiant energy of the sun.

Other features of the present invention may include a mounting casing 64 in which a roller element 66 may be rotatably positioned for rolling of the facing sheet 50 thereupon when it is desired to move the facing sheet into its stored position. Side casing structures 66 may also be provided to totally enclose or encase the air chamber 54.

What is claimed is:

1. A passive air system of the type primarily designed to heat and cool a building structure utilizing natural occurring phenomenon, said system comprising:
   a. an external covering structure mounted on and disposed in spaced relation to a roof of a building structure and dimensioned to cover an exterior surface of the roof,
   b. an air space defined between said external covering structure and said roof and extending substantially over the exterior surface of the roof,
   c. interconnecting means comprising a plurality of studs disposed in spaced, substantially parallel relation to one another and extending between open, opposite longitudinal ends of said air space, said plurality of studs disposed between adjacent ones of said air passages for interconnecting said external covering structure and the exterior surface of the roof,
   d. a plurality of air passages disposed within said air space and extending in communicating relation between said open, opposite longitudinal ends of said air space, said air passages structured to conduct air between said opposite ends of said air space and the exterior of said covering structure,
   e. said plurality of air passages and said studs extending upwardly at an incline from a lower one of said longitudinal ends to an upper one of said opposite longitudinal ends; said plurality of air passages disposed to conduct air current by convection within said air space and over the exterior surface of said roof,
   f. covering means movable secured to said covering structure for closing each of said opposite longitudinal ends of said air space, said covering means selectively movable between an open and a closed position,
   g. said closed position defined by covering relation to said opposite longitudinal ends and separating relation to the interior of said air space relative to the exterior thereof, said open position defined by non-covering relation of two said opposite longitudinal ends and fluid communication between the interior and exterior of said air space,
   h. said closed position of said covering means further defining air trapped within said air space, and said open position of said covering means further defining an air flow throughout said air space between said opposite longitudinal ends, and
   i. a plurality of air channels formed on the interior of said air space and extending in transverse relation to said plurality of air passages and extending between and communicating relation with open transverse ends of said air space, said plurality of air channels disposed and structured to conduct air therethrough between said transverse ends of said exterior of said air space, said covering means being further movably connected at each of said opposite transverse ends of said air space and movable between a closed position and an open position, said open position defined by communicating relation of each of said transverse ends with the exterior of said air space, said closed position defined by covering relation to said transverse ends and trapped relation of air within said air space relative to the exterior thereof.

2. A system as in claim 1 wherein said plurality of air passages are disposed in substantially parallel relation to one another, said air passages separated from one another by said interconnecting means.

3. A system as in claim 1 wherein said plurality of air channels are defined by a plurality of apertures formed in each of said plurality of studs, each of said studs including apertures formed therein in transverse orientation to said air passages and extending along the length thereof in spaced relation to one another, correspondingly positioned apertures of each stud disposed in substantially aligned relation to one another and each plurality of aligned apertures of said plurality of studs defining one of said plurality of air channels.

4. A system as in claim 1 wherein said covering means and said air channels are cooperatively structured to allow air flow through said air space and force wind from the exterior of said air space when said covering means are in an open position.

5. A system as in claim 1 wherein said covering means comprises a first and a second flap assembly movably mounted adjacent said open longitudinal ends of said air space and a third and fourth flap assembly mounted adjacent said open transverse ends of said air space; each of said flap assemblies selectively positionable between an open and a closed position.

6. A system as in claim 5 wherein said open position of said flap assemblies allow air flow through said air space, whereby the roof is cooled due to the continued fluid flow thereover; said closed position of said flap assemblies causing air to be trapped within said air space and absorbing heat from said external covering structure, the latter being exposed to the sun's radiant energy, whereby the roof is heated.

7. A system as in claim 6 wherein said external covering structure comprises an assembly of fiberglass material disposed in exposed relation to the sun's radiant energy.

8. A system as in claim 1 further comprising in combination a facing sheet of flexible, light polarizing material mounted in outwardly spaced relation to an external wall of the building structure, air chamber means defined between said facing sheet and the external wall.

9. A system as in claim 8 further comprising a vent assembly mounted at an upper end of said facing sheet and in fluid communication with said air chamber, said vent assembly positionable between an open and a closed position.

10. A system as in claim 9 further comprising an air trapped position of said facing sheet defined by engaging relation between the lower peripheral edge thereof and the supporting surface of the building, and said vent assembly being disposed in said closed position, whereby air is trapped within said air chamber and in heat receiving relation to said facing sheet and radiant energy delivered thereto.

11. A system as in claim 10 further comprising an air flow position of said facing sheet defined by said vent assembly disposed in said open position and said lower peripheral edge of said facing sheet being spaced from the supporting surface, whereby air circulates through said air chamber and the external wall is cooled thereby.

* * * * *